Jan. 22, 1929.  F. W. LANCHESTER  1,699,896
BRAKE MECHANISM
Filed July 16, 1924   2 Sheets-Sheet 1

Jan. 22, 1929.                F. W. LANCHESTER                1,699,896
                              BRAKE MECHANISM
                           Filed July 16, 1924            2 Sheets-Sheet 2

Inventor
F. W. Lanchester
by Marks & Clerk
  Attys.

Patented Jan. 22, 1929.

1,699,896

UNITED STATES PATENT OFFICE.

FREDERICK WILLIAM LANCHESTER, OF LONDON, ENGLAND, ASSIGNOR TO LANCHESTER'S LABORATORIES LIMITED, OF COVENTRY, ENGLAND.

BRAKE MECHANISM.

Application filed July 16, 1924, Serial No. 726,392, and in Great Britain July 19, 1923.

The present invention relates to brake mechanism for power-propelled vehicles of the type embodying a plurality of internal expanding bands or coils which operate cumulatively, each band or coil being adapted to act upon its neighbour in such manner that the combination acts effectively in either direction of rotation of the wheel to which the brake mechanism is applied.

The present invention has for its object to provide improved or simplified brake mechanism of this type.

The invention is particularly applicable to the front or steering wheels of a vehicle but it may be applied also to the rear or driving wheels.

Referring to the accompanying drawings:—

Figure 1:
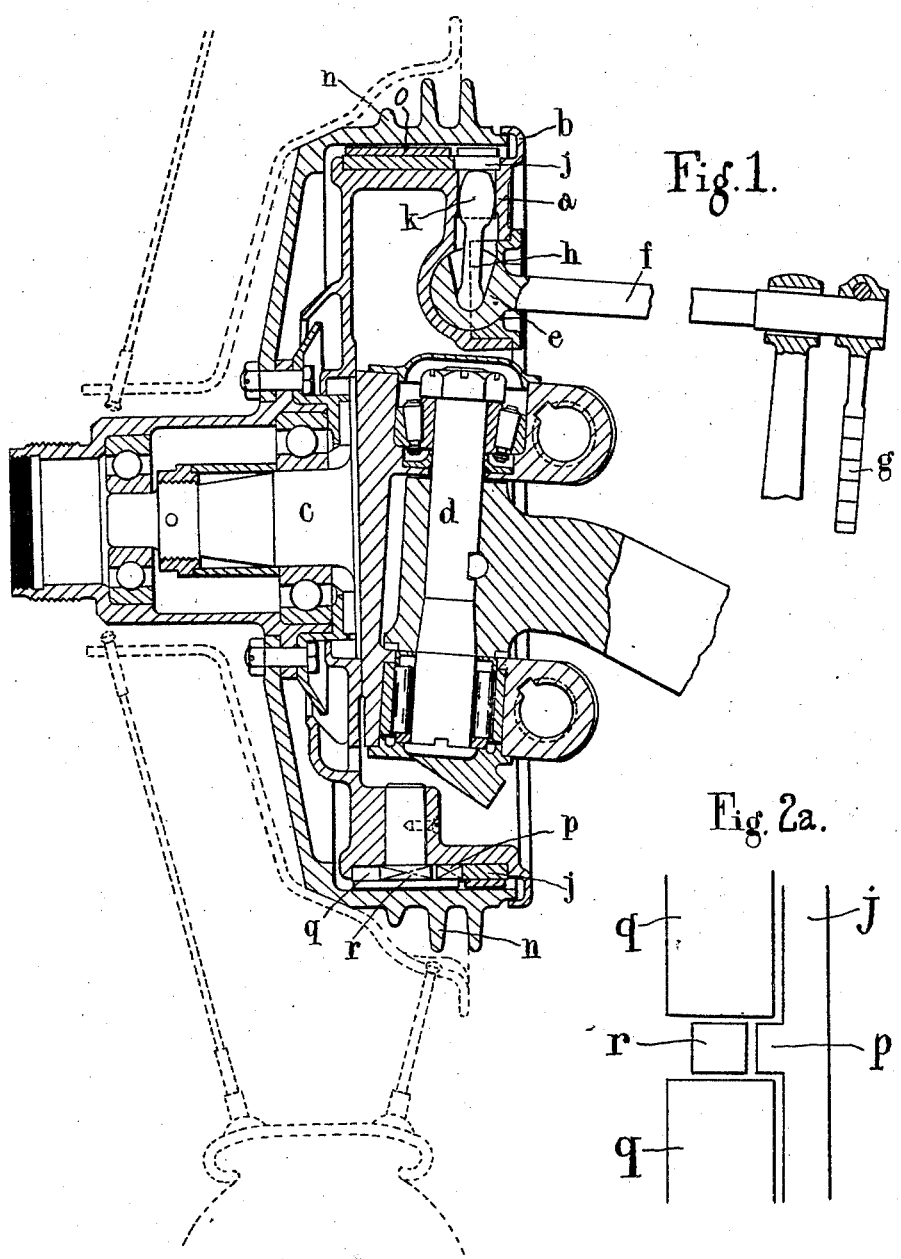

Figure 1 shows in vertical section, and

Figure 2:
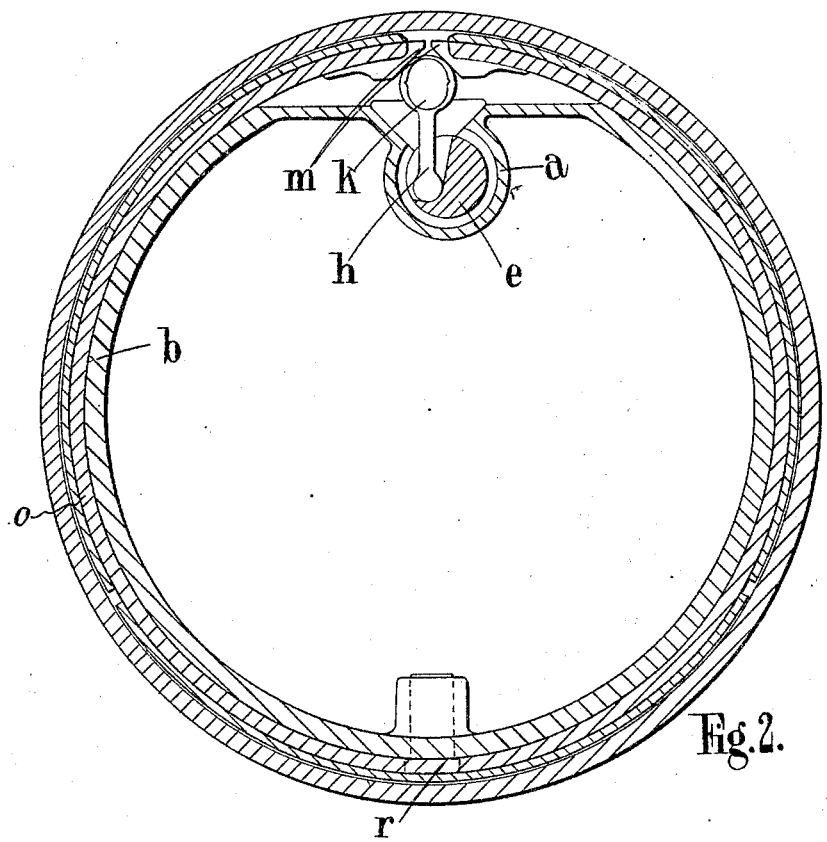

Figure 2 in elevation part section a convenient construction of front brake mechanism in accordance with the present invention.

Figure 2$^a$ represents a part plan view of a detail; and

Figure 3:
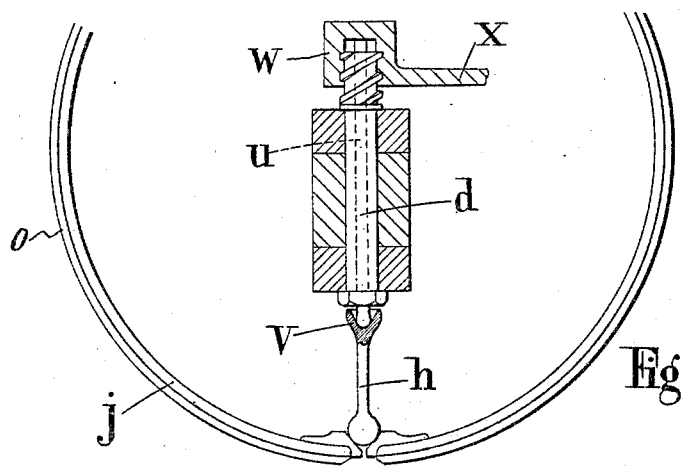

Figure 3 is a similar view to Figures 1 and 2 in respect of a rear brake mechanism.

One mode of carrying the present invention into effect as applied to a front wheel brake is illustrated in Figures 1 and 2. A bracket $a$ forming part of a brake cover plate $b$ is secured to the stock of the stub axle $c$ and is mounted in a suitable position above the pivot pin $d$. A spherical socket is provided in this bracket whose centre is approximately in line with the axis of the pivot pin $d$ and in this socket is housed the ball end $e$ of a shaft $f$ carrying an external lever $g$ adapted to be moved through a suitable angle by actuating mechanism (not shown). The ball end $e$ of the shaft $f$ is recessed to provide a seat or abutment for a spherical-headed link or cam $h$ of dumb-bell form, the said seat or abutment being eccentric to the ball end $e$. The opposite end $k$ of the dumb-bell link $h$ is also spherical and acts between the "horns" of the brake member $j$ which are shod with hardened steel pallets, $m$, $m$, having inclined plane faces to engage with the spherical-ended link. When the actuating shaft $f$ is rotated the dumb-bell head $k$ is forced like a wedge between the horn pallets $m$, $m$, of the brake member $j$, expanding same and bringing the friction material $o$ which is secured to the latter into frictional contact with the brake drum $n$. A projection or lug $p$ on this brake member engages between the horns of a second brake member $q$ between which also a fixed abutment $r$ is arranged, so that which ever way the wheel may be turning this second brake member is expanded in such a manner as to give cumulative brake effort in the manner common to band brakes whether of the internal or external type. The actuating dumb-bell $h$ allows of the first brake member $j$ floating through a sufficient angle to take up the clearance of the second brake member $q$ and any wear on same that may develop.

The spherical end $e$ of the actuating shaft $f$ permits of the steering movement of the road wheel through the angle of turn required with perfect freedom and the spherical ends of the knuckle link $h$ also allows of a certain degree of lateral movement in addition to the floating movement aforementioned.

In operation, when the operating arm $g$ is actuated the spherical end $e$ of the rod $f$ is rocked in its seating and the dumb-bell $h$ is moved upwards.

The head $k$ thus spreads the horn pallets $m$, $m$, and causes the friction surface of the ring $j$ to engage the brake drum $n$. The ring $j$ is thereby carried round somewhat until the projection $p$ thereon in bearing upon one end of the ring $q$ causes the other end of this ring to abut the fixed abutment $r$ as will be clear by reference to Figure 2$^a$. The ring $q$ is therefore expanded also as the wheel rotates so as to cause its friction surface to engage the brake drum.

The braking action is independent of the direction of rotation of the wheel.

It will be understood that the brake elements have a certain amount of inward elasticity and when the brake is not being applied they centre themselves on a drum or spider $b$ forming part of the brake cover plate.

According to the modification illustrated diagrammatically in Figure 3, the operation of moving the dumb-bell $h$ is somewhat different. In this example a thrust bar $u$ is adapted to bear within a socket formed in one end $v$ of the dumb-bell $h$ by means of thrust applied by a quick pitch threaded member $w$ actuated by the arm $x$.

Having now described my invention, what

I claim as new and desire to secure by Letters Patent is:—

1. An internal expanding brake mechanism of the type described, including a pair of sloping abutments at the ends of one band element, a spherical cup adapted to be actuated by an operating lever and a floating wedge member formed as a dumbbell with the spherical ends interposed between said sloping abutments and said cup, said member possessing freedom of motion in planes containing its axis.

2. Internal expanding brake mechanism of the type described including a pair of sloping abutments at the ends of one band element, a spherical cup socket formed in the spherical head of an operating spindle and a floating wedge member formed as a dumb-bell with spherical ends interposed between said sloping abutments and said socket.

3. Internal expanding brake mechanism of the type described including a pair of sloping abutments at the ends of one band element, a spherical cup attached to be actuated by an operating lever and a floating wedge member interposed between said sloping abutment and said cup, said member posssesing freedom of motion in planes containing its axis and possessing rotational freedom about its axis.

In testimony whereof I have signed my name to this specification.

FREDERICK WILLIAM LANCHESTER.